(12) United States Patent
Bukovec et al.

(10) Patent No.: US 11,702,187 B2
(45) Date of Patent: Jul. 18, 2023

(54) COLLAPSIBLE PYLONS FOR DRONE AIRCRAFT

(71) Applicant: Textron Innovations Inc., Providence, RI (US)

(72) Inventors: Robert Allen Bukovec, Dallas, TX (US); Nathaniel David Bryant, Dallas, TX (US); Levi Charles Hefner, Dallas, TX (US)

(73) Assignee: Textron Innovations, Inc., Providence, RI (US)

( * ) Notice: Subject to any disclaimer, the term of this patent is extended or adjusted under 35 U.S.C. 154(b) by 467 days.

(21) Appl. No.: 16/917,547

(22) Filed: Jun. 30, 2020

(65) Prior Publication Data

US 2021/0403141 A1    Dec. 30, 2021

(51) Int. Cl.
*B64C 9/34* (2006.01)
*B64D 27/26* (2006.01)
*B64U 50/13* (2023.01)

(52) U.S. Cl.
CPC ............. *B64C 9/34* (2013.01); *B64D 27/26* (2013.01); *B64U 50/13* (2023.01)

(58) Field of Classification Search
CPC ... B64C 9/34; B64C 2201/165; B64C 39/024; B64C 1/063; B64C 1/061; B64C 1/30; B64C 27/08; B64D 27/26
See application file for complete search history.

(56) References Cited

U.S. PATENT DOCUMENTS

| | | | |
|---|---|---|---|
| 2014/0263823 A1* | 9/2014 | Wang | B64C 27/08 |
| | | | 244/17.23 |
| 2017/0190412 A1* | 7/2017 | Bunting | B64C 1/30 |
| 2017/0297738 A1* | 10/2017 | von Flotow | B64C 39/024 |
| 2019/0009876 A1* | 1/2019 | Toyama | B64C 13/20 |

* cited by examiner

*Primary Examiner* — Christopher D Hutchens
*Assistant Examiner* — Steven J Shur
(74) *Attorney, Agent, or Firm* — Bradley Arant Boult Cummings (57) ABSTRACT

An example of a collapsible pylon for a drone aircraft includes a bore extending through a length of a barrel, a first and a second flex-pin bore formed through a wall of the barrel, a first arm slidably positioned within a first end of the bore, a first flex pin disposed on the first arm to engage the first flex-pin bore, a second arm slidably positioned within a second end of the bore, and a second flex pin disposed on the second arm to engage the second flex-pin bore.

8 Claims, 9 Drawing Sheets

COLLAPSIBLE PYLONS FOR DRONE AIRCRAFT

TECHNICAL FIELD

The present disclosure relates to drone aircraft and more particularly, but not by way of limitation, to collapsible pylons for drone aircraft.

BACKGROUND

This section provides background information to facilitate a better understanding of the various aspects of the disclosure. It should be understood that the statements in this section of this document are to be read in this light, and not as admissions of prior art.

Drone aircraft have grown in popularity in recent years and are used for a variety of purposes. For example, drone aircraft are used for personal, commercial, and military purposes. Drone aircraft are available in sizes ranging from small enough to fit in a palm up to full-size aircraft. Drone aircraft also utilize a variety of different propulsion systems to fly. Many drone aircrafts use propulsion systems that enable vertical takeoff and landing (VTOL). Propulsion systems for VTOL most often use four or more rotors to provide thrust. In order to provide stable flight characteristics, the four or more rotors are typically spaced apart from one another as much as is practical, as the closer together the rotors are the harder it is to control the drone aircraft. While spacing the rotors apart provides more stable flight characteristics, spacing the rotors apart also increases the size of the drone aircraft. The larger the drone aircraft becomes, the more difficult and cumbersome it becomes to store and transport the drone aircraft.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

An example of a collapsible pylon for a drone aircraft includes a bore extending through a length of a barrel, a first and a second flex-pin bore formed through a wall of the barrel, a first arm slidably positioned within a first end of the bore, a first flex pin disposed on the first arm to engage the first flex-pin bore, a second arm slidably positioned within a second end of the bore, and a second flex pin disposed on the second arm to engage the second flex-pin bore.

An example of a collapsible pylon for a drone aircraft includes a pylon rotatably coupled to the drone aircraft and comprising a pair of motor mounts disposed at opposite ends of the pylon, wherein the pylon can be locked in an extended position and in a collapsed position. In some aspects, the collapsible pylon includes a pylon mount comprising threads formed around an outer surface and a flex pin, a pylon connector on the pylon having a threaded barrel to engage the threads of the pylon mount, and a flex-pin bore formed through a wall of the threaded barrel to engage the flex pin. In other aspects, the collapsible pylon includes a locking pin that extends through a wing of the drone aircraft. The pylon includes a pivot connector having a first locking-pin bore and a second locking-pin bore, wherein when the pylon is locked in the extended position the locking pin engages the first locking-pin bore and when the pylon is locked in the collapsed position, the locking pin engages the second locking-pin bore.

An example of a drone aircraft includes a pair of rotors coupled to a wing via a collapsible pylon, wherein the collapsible pylon can be locked in a first position in which the drone aircraft is configured for flight and in a second position in which the drone aircraft is configured for storage.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

It is to be understood that the following disclosure provides many different aspects, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
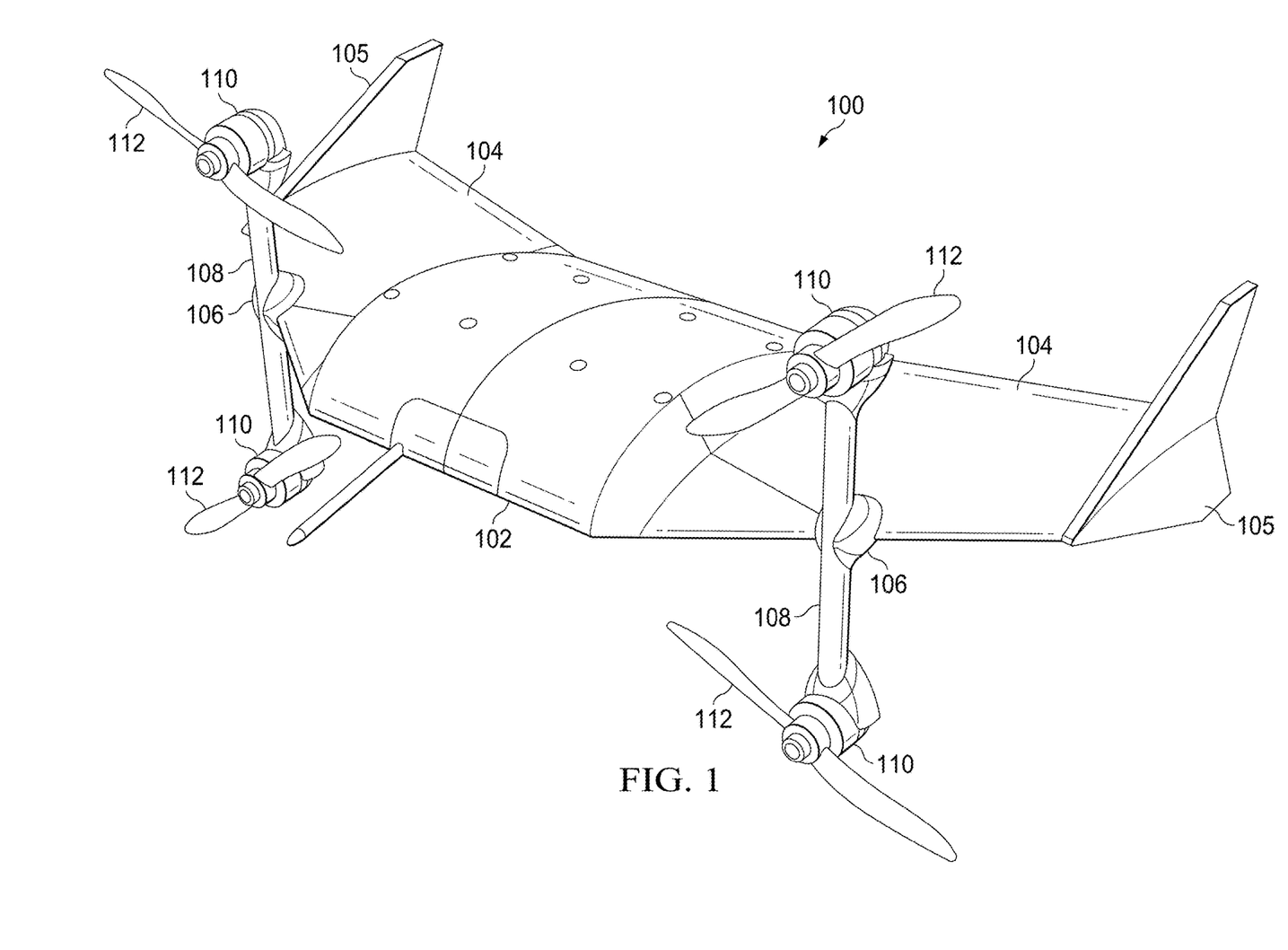
FIG. 1 is a perspective view of a drone aircraft, according to aspects of the disclosure.

FIG. 1 is a perspective view of a drone aircraft 100, according to aspects of the disclosure. Drone aircraft 100 is sized to fit within a backpack of a person (e.g., a soldier). In some aspects, drone aircraft 100 has a wing span of between around 1-2 feet. Drone aircraft 100 includes a fuselage 102 with wings 104 disposed on opposite sides thereof. Fuselage 102 may house various components, such as a battery, one or more sensors (e.g., cameras and the like), radios, controllers (e.g., processor with memory), data storage devices, and the like. Drone aircraft 100 may be flown manually via a remote or automatically (e.g., via a flight plan implemented by a controller onboard aircraft drone 100).

Each wing 104 includes a winglet 105 that improves the in-flight stability of drone aircraft 100. Each wing 104 also includes a pylon mount 106 to which a pylon 108 is secured. Each pylon 108 acts as a structural mounting point for two motors 110. Each motor 110 includes a rotor 112. Each motor 110 provides torque to its rotor 112 to generate thrust to propel drone aircraft 100 for flight. Drone aircraft 100 is what is sometimes called a tail-sitter drone. Tail-sitter drones take off and land similar to quad-copter drones (e.g., VTOL). For example, drone aircraft 100 rests on winglets 105 with its four rotors 112 oriented up. After lifting off the ground, drone aircraft transitions to winged flight by tilting forward and gaining horizontal velocity. As forward velocity is gained, wings 104 begin to generate lift. Landing drone aircraft 100 is accomplished by slowing the horizontal velocity of drone aircraft 100 to transition back into a vertical orientation with rotors 112 facing up. Drone aircraft 100 may then land similar to a quad-copter drone.

Drone aircraft 100 is designed to be portable. In particular, drone aircraft 100 is designed to be carried a small case, such as backpack, bag, or carrying case. In some aspects, drone aircraft 100 is carried by a soldier and launched for reconnaissance purposes. While drone aircraft 100 is relatively compact, the ability to store drone aircraft 100 in a backpack is hindered by the spacing of rotors 112. Rotors 112 must be sufficiently spaced apart to provide the needed control authority to provide stabile operation during vertical flight and hovering maneuvers. To improve the portability of drone aircraft 100, drone aircraft 100 may be fitted with collapsible pylons that reduce an overall size of drone aircraft 100 when drone aircraft 100 is not in use.

Figure 2:
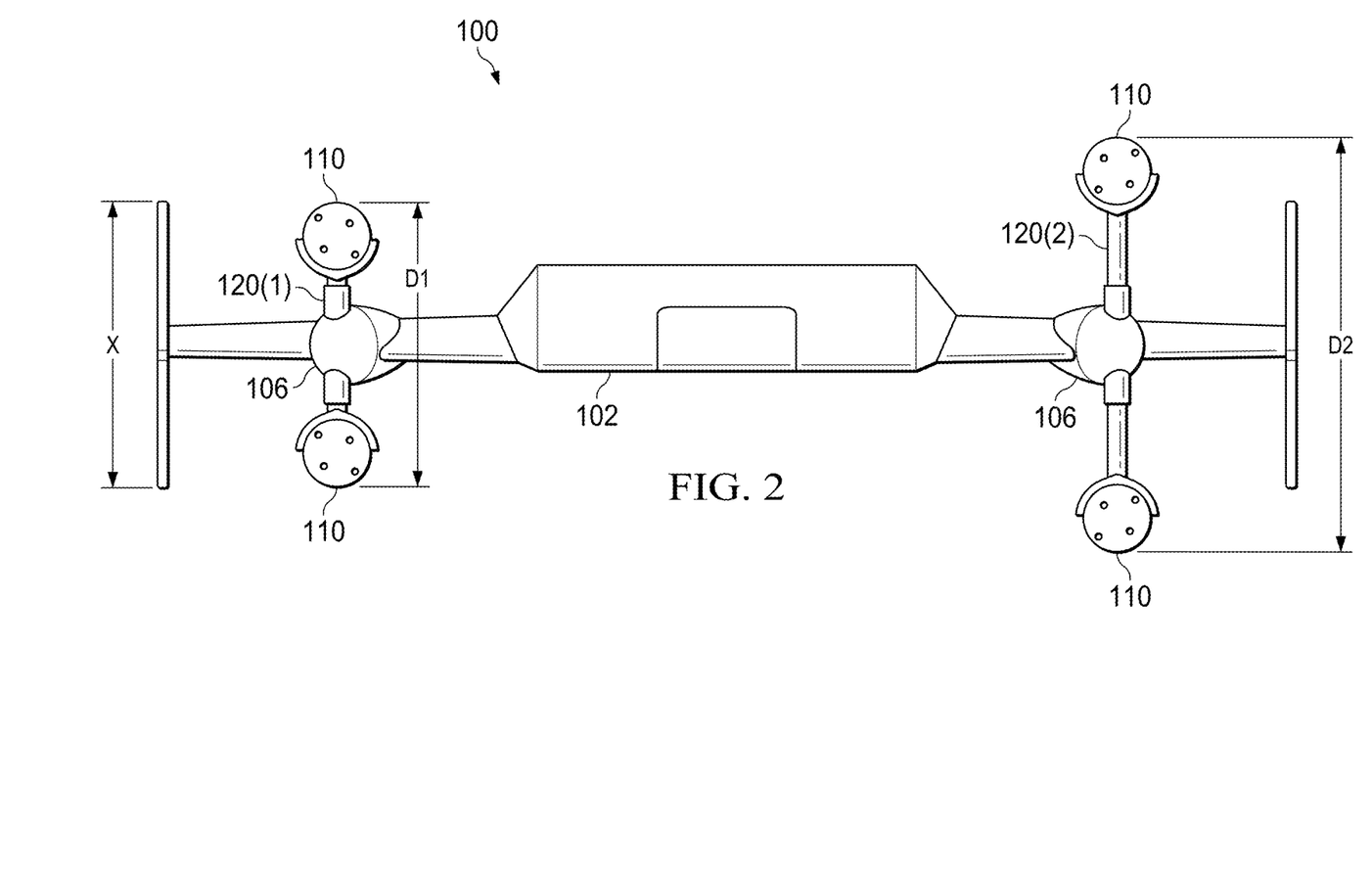
FIG. 2 is a front view of a drone aircraft, according to aspects of the disclosure.
Figure 3:
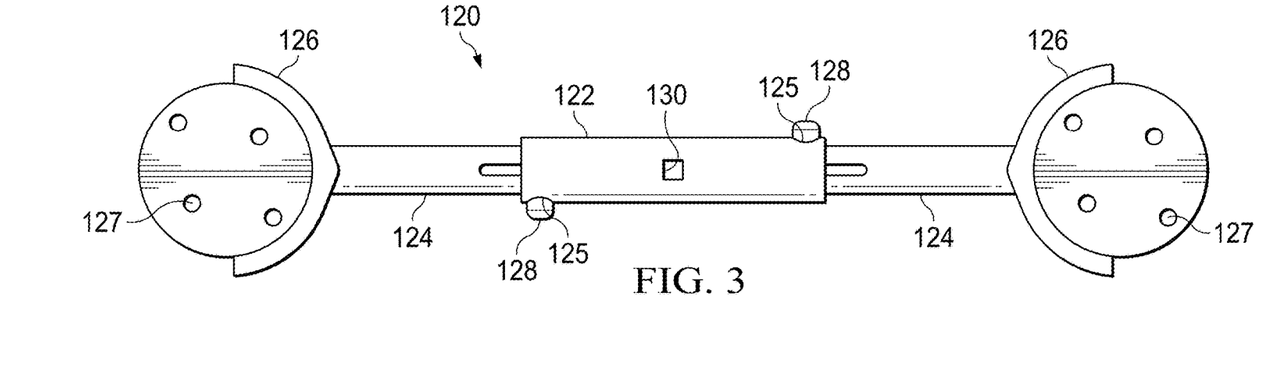
FIG. 3 is front view of a collapsible pylon for a drone aircraft, according to aspects of the disclosure.
Figure 4:
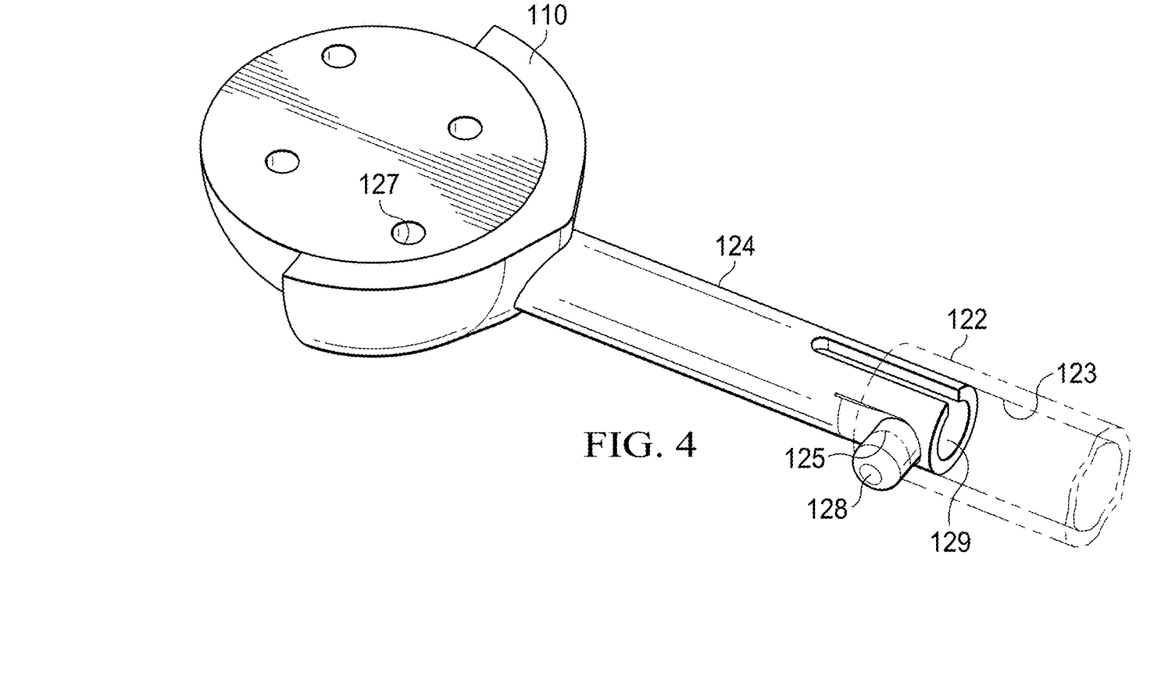
FIG. 4 is a close-up view of the collapsible pylon of FIG. 3, according to aspects of the disclosure.

Referring now to FIGS. 2-4, a collapsible pylon 120 for use with drone aircraft 100 is shown, according to aspects of the disclosure. FIG. 2 is a front view of drone aircraft 100 that has been fitted with a pair of collapsible pylons 120, FIG. 3 is front view of one collapsible pylon 120, and FIG. 4 is a close-up view of one end of collapsible pylon 120. FIG. 2 illustrates drone aircraft 100 with two collapsible pylons 120(1), 120(2). Collapsible pylon 120(1) is shown in the collapsed position and collapsible pylon 120(2) is shown in the extended position. Rotors 112 are hidden from view in FIGS. 2-4 for the purpose of illustration. In the collapsed position, a distance D1 (the distance between motors 110 in the collapsed position) is approximately less than or equal to a distance X (the vertical height of winglet 105). In the extended position, a distance D2 (the distance between motors 110 in the extended position) is greater than distance X. The collapsed position reduces the overall size of drone aircraft 100, making it easier to store drone aircraft 100 in a backpack or carrying case.

Collapsible pylon 120 includes a barrel 122 that includes a bore 123 (see FIG. 4) that receives arms 124. A first end of each arm 124 is configured to slide into barrel 122 and a second end of each arm 124 includes a motor mount 126. Motor mounts 126 are configured to secure motors 110 thereto. Motors 110 are hidden in FIGS. 2-4 for clarity. In some aspects, each motor mount 126 includes one or more bores 127 that can be used to secure motor 110 to motor mount 126 and/or allow wires from motor 110 to pass through motor mount 126 to be threaded into a bore 129 (see FIG. 4) of arm 124 so that the wires may be concealed therein. The wires exit bore 129 of arm 124 and enter bore 123 of barrel 122. The wires then exit barrel 122 via a cutout 130, which is disposed within pylon mount 106. The wires may then be connected to components (e.g., a controller etc.) within fuselage 102.

Figure 5:
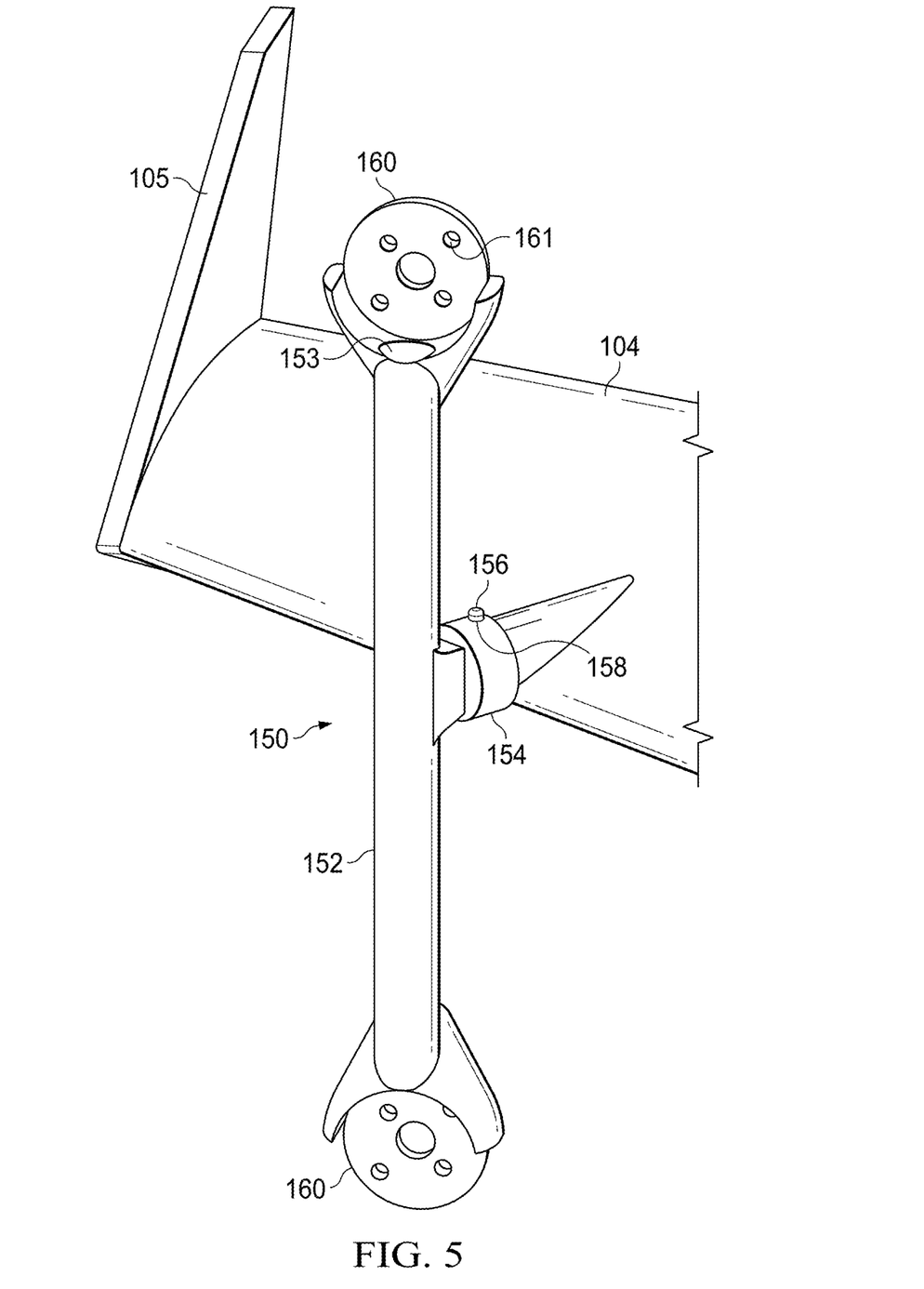
FIG. 5 is a partial perspective view of a collapsible pylon for a drone aircraft, according to aspects of the disclosure.

Each arm 124 includes a flex pin 128 that locks into a flex-pin bore 125 of barrel 122 to lock arm 124 in the extended position (best seen in FIGS. 4 and 5). Flex pin 128 is disposed on a tongue 133 that flexes to allow flex pin 128 to be displaced radially. To unlock arm 124, a user presses flex pin 128 to disengage flex pin 128 from flex-pin bore 125. With flex pin 128 disengaged from flex-pin bore 125, arm 124 can then slide into barrel 122 into the collapsed position.

Figure 6:
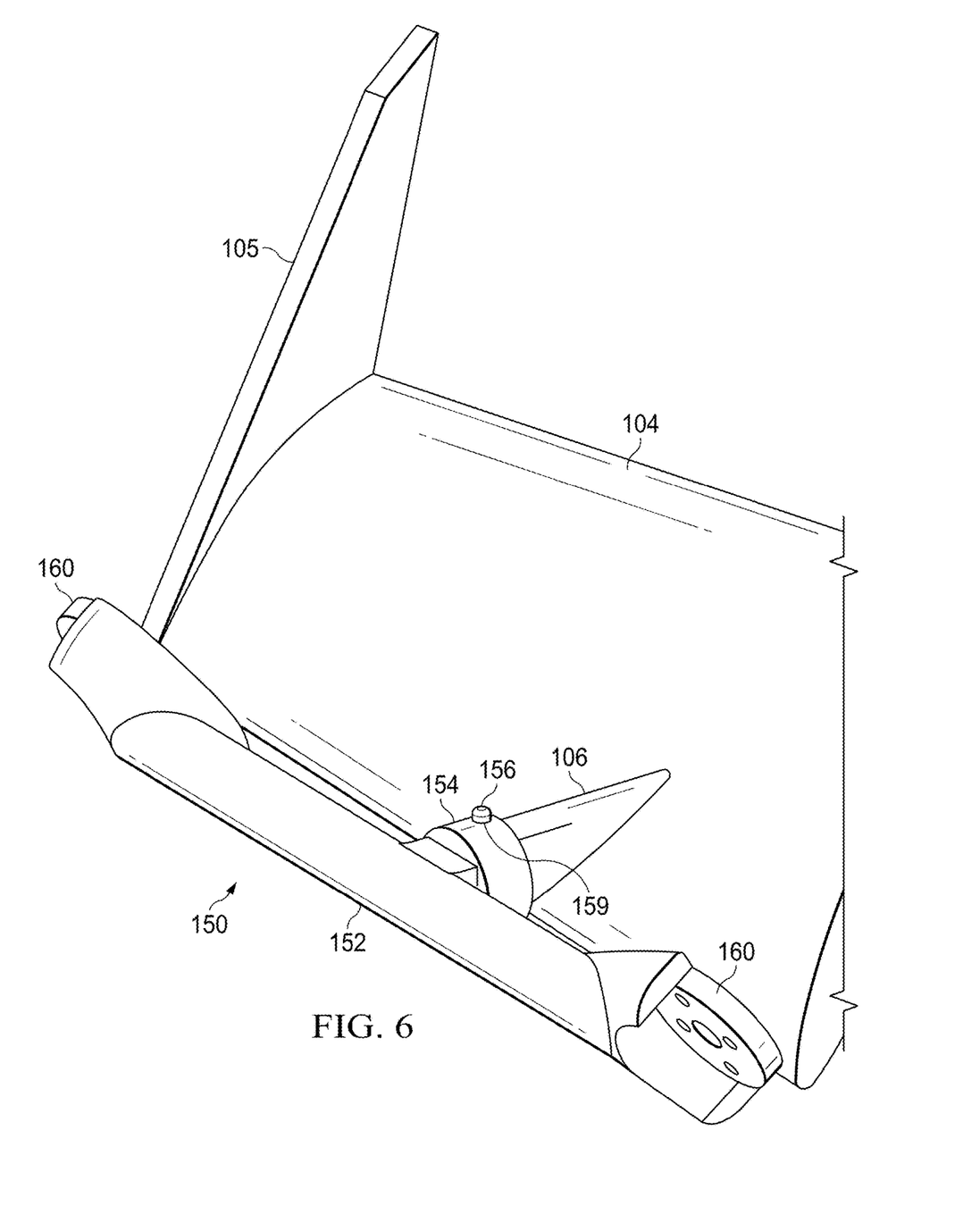
FIG. 6 is a partial perspective view of the collapsible pylon of FIG. 5, according to aspects of the disclosure.
Figure 7:
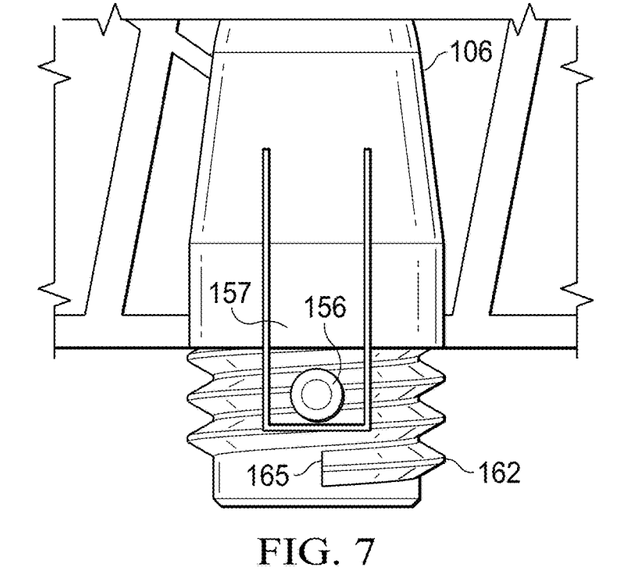
FIG. 7 is a close-up view of a locking tab of the collapsible pylon of FIG. 5, according to aspects of the disclosure.
Figure 8:
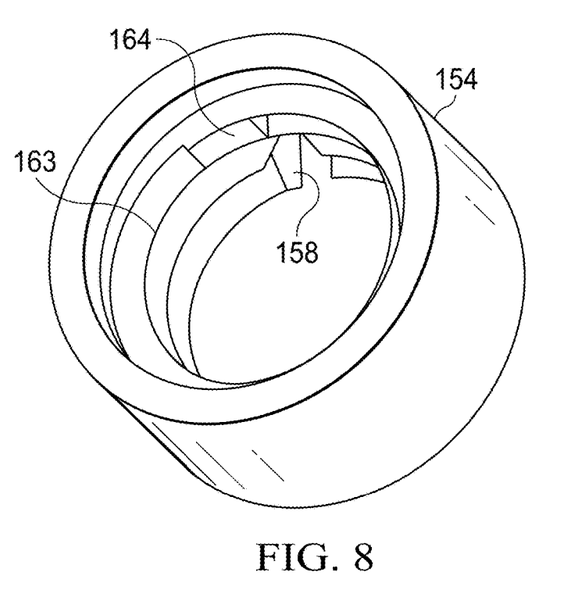
FIG. 8 is a close-up view of connector for the collapsible pylon of FIG. 5, according to aspects of the disclosure.

FIGS. 5-8 illustrate a collapsible pylon 150 for drone aircraft 100, according to aspects of the disclosure. FIG. 5 is a perspective view of a single collapsible pylon 150 in an extended position, FIG. 6 is a perspective view of collapsible pylon 150 in a collapsed position, FIG. 7 is a close-up view of a flex pin 156, and FIG. 8 is a close-up view of an inside of a pylon connector 154. While FIG. 5 shows only a single collapsible pylon 150, those having skill in the art will recognize that two collapsible pylons 150 may be used with drone aircraft 100.

Collapsible pylon 150 includes a pylon 152 and pylon connector 154. Pylon 152 includes a bore 153 that can act as a conduit for wires from motor 110. Pylon connector 154 includes a threaded barrel that threads onto pylon mount 106. Pylon connector 154 is configured to lock collapsible pylon 150 in place for flight and to allow collapsible pylon 150 to rotate into the position illustrated in FIG. 6 to reduce an overall size of drone aircraft 100. In aspects using collapsible pylon 150, pylon mount 106 includes a flex pin 156 that engages a flex-pin bore 158 of pylon connector 154 when collapsible pylon 150 is in the extended position, similar to the engagement of flex pin 128 with flex-pin bore 125. In some aspects, pylon connector 154 includes a flex-pin bore 159 (see FIG. 6) that that receives flex pin 156 when collapsible pylon 150 is in the collapsed position. As illustrated in FIG. 7, flex pin 156 is positioned on a threaded portion of pylon mount 106. Collapsible pylon 150 can be transitioned from the extended position by pressing flex pin 156 to disengage flex pin 156 from flex-pin bore 158. With flex pin 156 disengaged from flex-pin bore 158, pylon 152 is free to rotate to the position illustrated in FIG. 6.

Collapsible pylon 150 includes a pair of motor mounts 160 disposed at opposite ends of pylon 152. Motor mounts 160 are similar to motor mounts 126 and may include one or more bores 161 that can be used to secure motor 110 to motor mount 160 and/or allow wires from motor 110 to pass through motor mount 160 and to be threaded into bore 153 so that the wires may be concealed therein.

Referring now to FIG. 7, a close-up view of flex pin 156 of pylon mount 106 is shown. Flex pin 156 is disposed on a tongue 157 that allows flex pin 156 to be displaced radially from flex-pin bore 158 to unlock pylon 152 for rotation. Pylon mount 106 also includes threads 162 that engage threads 163 of pylon 154. FIG. 8 is perspective view of pylon connector 154 with pylon 152 hidden from view to better show an interior of pylon connector 154. Pylon connector 154 includes a tab 164 that abuts a thread end 165 of threads 162 to help index pylon 152 to the proper orientation so that motors 110 are correctly located for flight. Pylon connector 154 includes an opening through which wires of motors 110 from bore 153 may pass to connect to components within fuselage 102.

Figure 9:
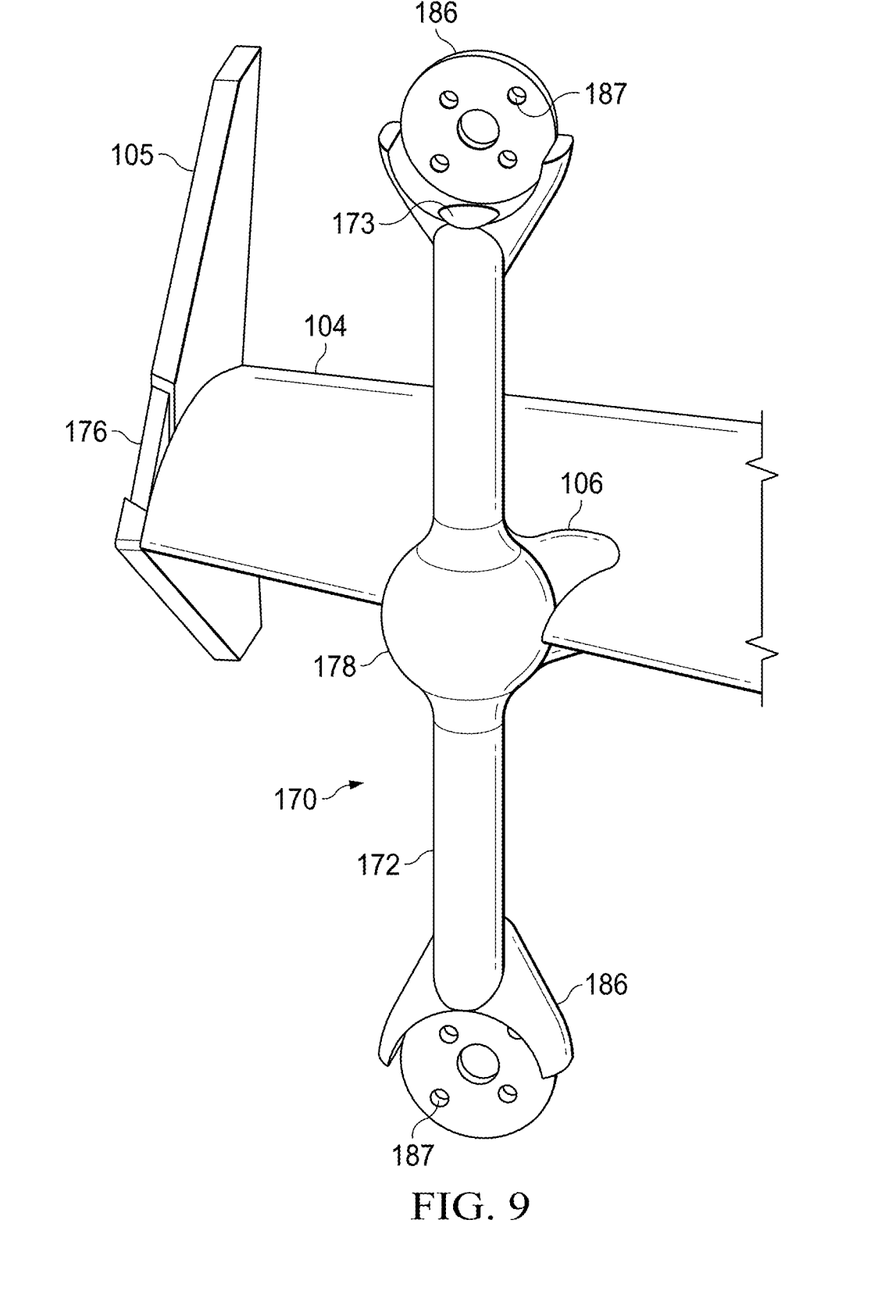
FIG. 9 is a partial perspective view of a collapsible pylon for a drone aircraft, according to aspects of the disclosure.
Figure 10:
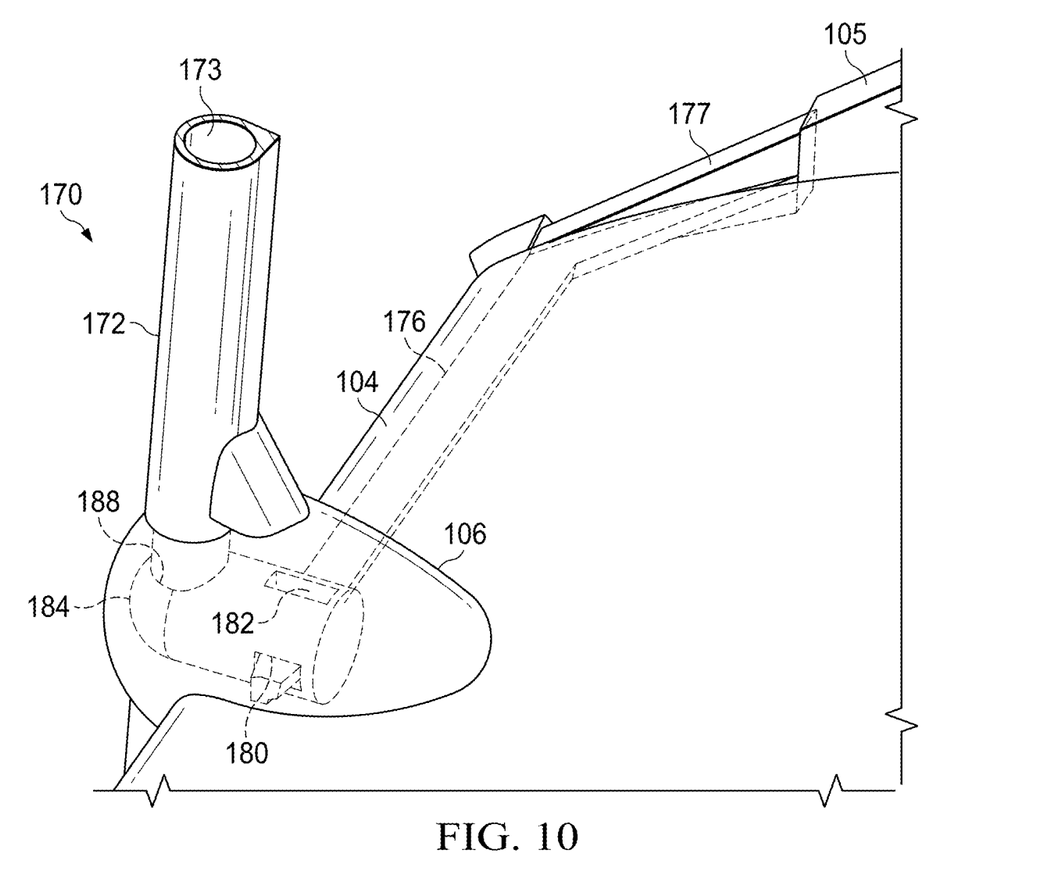
FIG. 10 is a partial perspective view of the collapsible pylon of FIG. 9, according to aspects of the disclosure.
Figure 11:
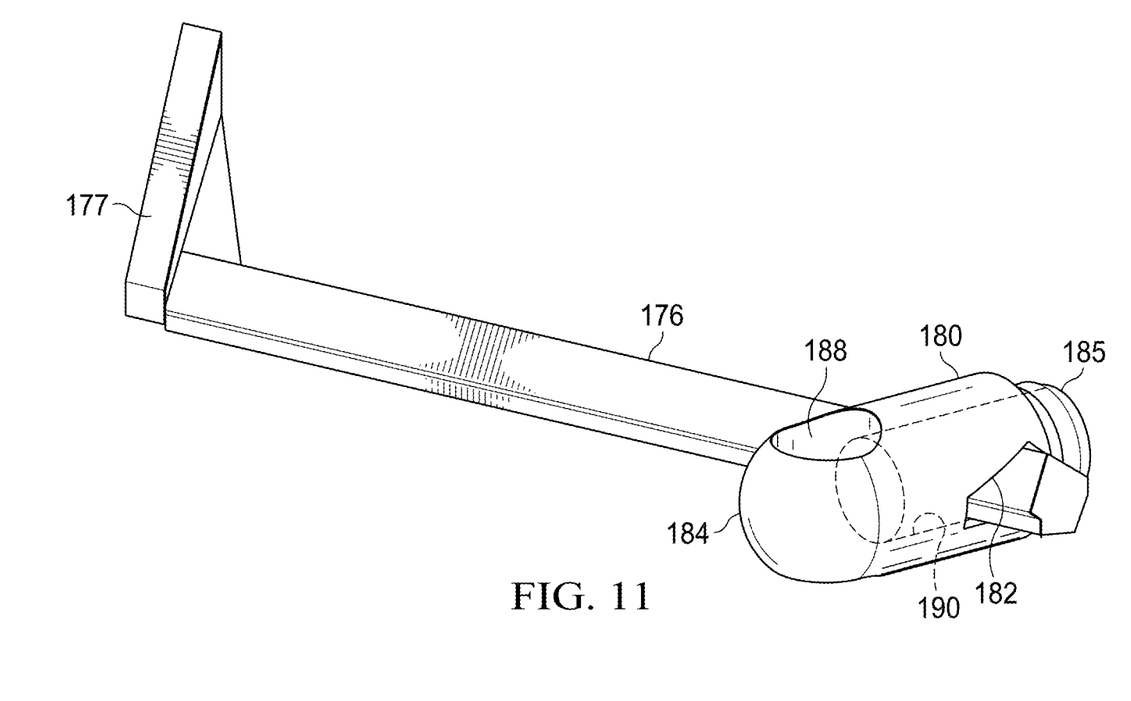
FIG. 11 is a partial perspective view of a locking pin of the collapsible pylon of FIG. 9, according to aspects of the disclosure.

FIGS. 9-11 illustrate a collapsible pylon 170 for drone aircraft 100, according to aspects of the disclosure. FIG. 9 is a partial perspective view of collapsible pylon 170, FIG. 10 is a partial perspective view of collapsible pylon 170 with an outer surface of wing 104 hidden, and FIG. 11 is a perspective view of a locking pin 176 and a pivot 184 of collapsible pylon 170. While FIG. 9 shows only a single collapsible pylon 170, those having skill in the art will recognize that two collapsible pylons 170 may be used with drone aircraft 100.

Collapsible pylon 170 includes a pylon 172 and is similar to collapsible pylon 150, but flex pin 156 has been replaced with a locking pin 176. Locking pin 176 is configured to slide within wing 104 to engage and disengage a pair of locking-pin bores 180, 182 of a pivot connector 184 (best seen in FIGS. 10 and 11). Pivot connector 184 is attached to pylon 172 at a first end and rotatably attached to pylon mount 106 at a second end. Pivot connector 184 is free to rotate relative to pylon mount 106 when locking pin 176 is disengaged from pivot connector 184. When locking pin 176 is engaged with locking-pin bore 180, pylon 172 is oriented as shown in FIGS. 9 and 10 and drone aircraft 100 is in an extended position for flight. When locking pin 176 is engaged with locking-pin bore 182, pylon 172 is in an orientation similar to that of pylon 152 in FIG. 6 and drone aircraft 100 is in a collapsed position for storage. In a typical aspect, locking-pin bores 180, 182 are formed through pivot connector 184 at a 90° angle relative to one another. In other aspects, locking-pin bores 180, 182 may be formed through pivot connector 184 at any angle between 60-90°.

Pylon 172 includes a bore 173 that can act as a conduit for wires from motor 110. Pylon 172 also includes a pair of motor mounts 186 disposed at opposite ends of pylon 172. Motor mounts 186 are similar to motor mounts 126 and may include one or more bores 187 that can be used to secure motor 110 to motor mount 186 and/or allow wires from motor 110 to pass through motor mount 186 and to be threaded into bore 173 so that the wires may be concealed therein.

FIG. 11 illustrates locking pin 176 and pivot connector 184 with wing 104 hidden to better show the engagement of locking pin 176 with pivot connector 184. Pivot connector 184 includes a pylon bore 188 to which pylon 172 attaches. Pivot connector 184 also includes a bore 190 along its length that allows wires from motors 110 to pass therethrough and into wing 104. Pivot connector 184 includes a threaded end 185 that engages threads of pylon mount 106. In some aspects, the threads of threaded end 185 and pylon mount 106 include stops, similar to tab 164 to limit the amount of rotation of collapsible pylon 170 between the extended position (see FIG. 9) and the collapsed position (similar to the position of collapsible pylon 150 illustrated in FIG. 6).

In some aspects, collapsible pylon 170 includes a first tab associated with pylon 172 and a second tab associated with pylon mount 106. For example, the first tab may be positioned on an inside of a housing 178 of pylon 172 and the second tab may be positioned within pylon mount 106. When collapsible pylon 170 is in the extended position, the first tab and the second tab are offset from one another by approximately ninety degrees. When collapsible pylon 170 is moved from the extended position to the collapsed position, pylon 172 can be rotated approximately ninety degrees until the first and second tab abut one another, limiting the rotation of pylon 172. With pylon 172 rotated into the collapsed position, locking pin 176 may be inserted into locking-pin bore 182 to lock pylon 172 in the collapsed position.

In FIG. 11, locking pin 176 is shown engaged with locking-pin bore 180. To collapse pylon 172, locking pin 176 is pulled out away from winglet 105 to disengage locking pin 176 from locking-pin bore 180. Locking pin 176 includes a handle 177 that provides a user an easy way to push/pull locking pin 176 out of and into wing 104. As illustrated in FIG. 10, handle 177 has a shape that forms part of winglet 105. Pylon 172 may then be rotated to be generally parallel with wing 104 (similar to the orientation of pylon 152 in FIG. 6). Locking pin 176 is then pushed back toward winglet 105 to engage locking pin 176 with locking-pin bore 182. Drone aircraft 100 is then configured for storage. To configure drone aircraft 100 for flight, locking pin 176 is disengaged from locking-pin bore 182, pylon 172 is then rotated back into the orientation shown in FIG. 9, and locking pin 176 is engaged with locking-pin bore 180.

Collapsible pylons 120, 150, and 170 are discussed above relative to drone aircraft 100. Those having skill in the art will recognize that the concepts of collapsible pylons 120, 150, and 170 can be applied to various other aircraft, including full-size aircraft and other drone aircraft that are larger or smaller than drone aircraft 100.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A collapsible pylon for a drone aircraft, the collapsible pylon comprising:
    an axially extending tubular barrel having a first barrel end and a second barrel end;
    a first flex-pin bore formed through a wall of the barrel adjacent to the first barrel end and a second flex-pin bore formed through the wall of the barrel adjacent to the second barrel end;
    a first arm having a first inboard end slidably positioned within the first barrel end and a first motor mount at an opposite end, wherein the first arm is axially slidable relative to the barrel between a first arm extended position and a first arm collapsed position;

a first flex pin disposed on the first arm adjacent to the first inboard end to engage the first flex-pin bore when the first arm is in the first arm extended position;

a second arm having a second inboard end slidably positioned within the second barrel end and a second motor mount on an opposite end, wherein the second arm is axially slidable relative to the barrel between a second arm extended position and a second arm collapsed position; and a second flex pin disposed on the second arm adjacent to the second inboard end to engage the second flex-pin bore when the second arm is in the second arm extended position:

wherein the first motor mount and the second motor mount are separated by an extended distance when the first arm is in the first arm extended position and the second arm is in the second arm extended position, and the first motor mount and the second motor mount are separated by a collapsed distance that is less than the extended distance when at least one of the first arm is in the first arm collapsed position or the second arm is in the second arm collapsed position.

2. The collapsible pylon of claim 1, wherein:

the barrel comprises a tab extending inside of the barrel; and the first arm comprises an axial slot that engages the tab.

3. The collapsible pylon of claim 1, wherein the first flex pin is positioned on a tongue that allows the first flex pin to be displaced radially to disengage the first flex pin from the first flex-pin bore.

4. A drone aircraft comprising:

a wing comprising a pylon mount;

a collapsible pylon moveably attached to the pylon mount to rotate between a storage position, parallel to the wing, and a flight position, nonparallel to the wing, wherein the collapsible pylon comprises:

an axially extending tubular barrel having a first barrel end and a second barrel end;

a first flex-pin bore formed through a wall of the barrel adjacent to the first barrel end and a second flex-pin bore formed through the wall of the barrel adjacent to the second barrel end;

a first arm having a first inboard end slidably positioned within the first barrel end and a first rotor at an opposite end, wherein the first arm is axially slidable relative to the barrel between a first arm extended position and a first arm collapsed position;

a first flex pin disposed on the first arm adjacent to the first inboard end to engage the first flex-pin bore when the first arm is in the first arm extended position;

a second arm having a second inboard end slidably positioned within the second barrel end and a second rotor on an opposite end, wherein the second arm is axially slidable relative to the barrel between a second arm extended position and a second arm collapsed position; and a second flex pin disposed on the second arm adjacent to the second inboard end to engage the second flex-pin bore when the second arm is in the second arm extended position:

wherein the first rotor and the second rotor are separated by an extended distance when the first arm is in the first arm extended position and the second arm is in the second arm extended position, and the first rotor and the second rotor are separated by a collapsed distance that is less than the extended distance when at least one of the first arm is in the first arm collapsed position or the second arm is in the second arm collapsed position.

5. The drone aircraft of claim 4, wherein:

the pylon mount comprises external threads and a pylon flex pin; and the collapsible pylon has a threaded pylon connector to engage the external threads and a flight bore to engage the pylon flex pin when the collapsible pylon is in the flight position.

6. The drone aircraft of claim 5, wherein the collapsible pylon comprises a storage bore to engage the pylon flex pin when the collapsible pylon is in the storage position.

7. The drone aircraft of claim 4, further comprising:

a locking pin that is slidably positioned inside of the wing; and a pivot connector on the collapsible pylon comprising a first locking-pin bore and a second locking-pin bore, wherein, when the collapsible pylon is in the flight position the locking pin engages the first locking-pin bore, and when the collapsible pylon is in the storage position the locking pin engages the second locking-pin bore.

8. The drone aircraft of claim 7, wherein the locking pin comprises a handle that comprises a portion of a winglet of the wing.

* * * * *